United States Patent
Xu et al.

(10) Patent No.: US 12,475,642 B2
(45) Date of Patent: Nov. 18, 2025

(54) DATA PROCESSING METHOD AND APPARATUS, COMMUNICATION NODE AND STORAGE MEDIUM

(71) Applicants: ZTE CORPORATION, Shenzhen (CN); Shanghai Jiao Tong University, Shanghai (CN)

(72) Inventors: Yiling Xu, Shanghai (CN); Lizhi Hou, Shanghai (CN); Yunfeng Guan, Shanghai (CN); Jun Sun, Shanghai (CN); Zhao Wu, Shenzhen (CN); Qiuting Li, Shenzhen (CN); Ping Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 249 days.

(21) Appl. No.: 18/255,992

(22) PCT Filed: Nov. 2, 2021

(86) PCT No.: PCT/CN2021/128213
§ 371 (c)(1),
(2) Date: Jun. 5, 2023

(87) PCT Pub. No.: WO2022/116764
PCT Pub. Date: Jun. 9, 2022

(65) Prior Publication Data
US 2024/0054723 A1    Feb. 15, 2024

(30) Foreign Application Priority Data
Dec. 4, 2020 (CN) .......................... 202011407418.6

(51) Int. Cl.
*G06T 17/00* (2006.01)

(52) U.S. Cl.
CPC .................................. *G06T 17/00* (2013.01)

(58) Field of Classification Search
CPC ........................................................ G06T 17/00
(Continued)

(56) References Cited

U.S. PATENT DOCUMENTS

| 12,216,289 B2* | 2/2025 | Lee ......................... H04N 23/45 |
| 2019/0318488 A1 | 10/2019 | Lim et al. |
| 2021/0281885 A1* | 9/2021 | Sugio .................. H04N 19/172 |

FOREIGN PATENT DOCUMENTS

| CN | 109886272 A | 6/2019 |
| CN | 111699697 A | 9/2020 |

(Continued)

OTHER PUBLICATIONS

International Search Report in Application No. PCT/CN2021/128213 dated Jan. 21, 2022, 4 pages, including translation.

(Continued)

*Primary Examiner* — Thomas J Lett
(74) *Attorney, Agent, or Firm* — Morgan, Lewis & Bockius LLP (57) ABSTRACT

Provided are a data processing method and apparatus, a communication node, and a storage medium. The data processing method includes determining multi-frame combined point cloud information; writing the multi-frame combined point cloud information into media streams of combined point cloud data; and sending, according to the multi-frame combined point cloud information, the media streams of the combined point cloud data to a receiving end separately.

16 Claims, 4 Drawing Sheets

(58) Field of Classification Search
USPC .......................................................... 345/419
See application file for complete search history.

(56) References Cited

FOREIGN PATENT DOCUMENTS

| | | |
|---|---|---|
| CN | 112583803 A | 3/2021 |
| WO | WO 2020/116619 A1 | 6/2020 |

OTHER PUBLICATIONS

European Search Report in Application No. 21899798.9, dated Oct. 9, 2024, 9 pages, including translation.
Yiling Xu et al: "On GPCC Combine Frame Coding in MPEG-I Part 18", 133. MPEG Meeting; Jan. 11, 2021-Jan. 15, 2021; Online; (Motion Picture Expert Group or ISO/IEC JTC1/SC29/WG11), No. m55949 Jan. 10, 2021 (Jan. 10, 2021), XP030290802, Retrieved from the Internet: URL:https://dms.mpeg.expert/doc_end_user/documents/133_OnLine/wg11/m55949-v2-m55949-OnGPCC-CombineFrameCodinginMPEG-IPart18.zip m5549-On GPCC Combine Frame Coding in MPEG-I Part 18.docx.

* cited by examiner

DATA PROCESSING METHOD AND APPARATUS, COMMUNICATION NODE AND STORAGE MEDIUM

CROSS REFERENCE TO RELATED APPLICATIONS

This is a National Stage Application, filed under 35 U.S.C. 371, of International Patent Application No. PCT/CN2021/128213, filed on Nov. 2, 2021, which claims priority to Chinese Patent Application No. 202011407418.6 filed with the China National Intellectual Property Administration (CNIPA) on Dec. 4, 2020, the disclosures of which are incorporated herein by reference in their entireties.

TECHNICAL FIELD

The present application relates to communication, for example, a data processing method and apparatus, a communication node, and a storage medium.

BACKGROUND

With the increasing maturity of three-dimensional scanning technology and system, the manufacturing cost of a 3-dimension (3D) scanner instrument is reduced, and the accuracy is improved. Thus, point cloud data based on three-dimensional coordinate information of the actual object surface can be quickly and accurately acquired and stored, which makes point cloud data gradually widely used in various image processing fields.

The point cloud data are three-dimensional coordinate data information acquired after three-dimensional scanning of an object. Meanwhile, the point cloud data may also record attribute information such as color and reflectivity on a corresponding point. With the improvement in the accuracy and speed of a three-dimensional scanning system, the data amount of scanned point cloud data can reach the order of several million or more. At present, massive point cloud data bring a heavy burden for computer storage, processing, and transmission.

Compression algorithms of the point cloud have been systematically studied and may be divided into video-based point cloud coding (V-PCC) and geometry-based point cloud coding (G-PCC). The compression method of the G-PCC is to convert the point cloud data into components such as geometric information and attribute information and then separately encode the geometric information and the attribute information into point cloud data streams. The geometric information is position information of the point and is described and encoded in the form of an octree. The attribute information represents different types such as color and reflectivity of the point. The octree descriptions of point cloud images adjacent in the time domain may remain unchanged within a certain period of time, that is, several frames of point cloud images may share the same octree description. Therefore, to improve compression efficiency, points of different point cloud images within this period of time may be combined on a leaf node at the same position in the octree and these points are marked with different frame indexes to indicate differences. The frame index is a type of attribute information. In this manner, combine frame coding may be performed on multi-frame point cloud data to obtain combined point cloud data.

Due to the great uncertainty in contents and the number of point cloud frames contained in the combined point cloud data, a user may have consumption requirements for both the split multi-frame point cloud data and the combined single-frame point cloud data. Meanwhile, due to different network conditions and hardware devices, transmission and consumption of other non-frame index attribute information (for example, the color and the reflectivity) may be flexibly and dynamically adjusted. However, different consumption requirements of streams corresponding to the combined point cloud data are not considered in terms of the current encapsulation, transmission, and consumption manners of the point cloud data. Therefore, if all combined point cloud data are transmitted according to the same strategy, information that is not preferentially used occupies a large amount of network or decoding resources, which is not conducive to efficient transmission and flexible use by users.

SUMMARY

Embodiments of the present application provide a data processing method and apparatus, a communication node, and a storage medium so as to improve the transmission efficiency of combined point cloud data, thereby facilitating the flexible use by users.

An embodiment of the present application provides a data processing method. The method includes the following:

Multi-frame combined point cloud information is determined.

The multi-frame combined point cloud information is written into media streams of combined point cloud data.

According to the multi-frame combined point cloud information, the media streams of the combined point cloud data are sent to a receiving end separately.

An embodiment of the present application provides a data processing method. The method includes the following:

Media streams of combined point cloud data are parsed to obtain multi-frame combined point cloud information.

The combined point cloud data are processed separately according to the multi-frame combined point cloud information.

An embodiment of the present application provides a data processing apparatus. The apparatus includes a determination module, a writer, and a sender.

The determination module is configured to determine multi-frame combined point cloud information.

The writer is configured to write the multi-frame combined point cloud information into media streams of combined point cloud data.

The sender is configured to send, according to the multi-frame combined point cloud information, the media streams of the combined point cloud data to a receiving end separately.

An embodiment of the present application provides a data processing apparatus. The apparatus includes a parser and a processor.

The parser is configured to parse media streams of combined point cloud data to obtain multi-frame combined point cloud information.

The processor is configured to process, according to the multi-frame combined point cloud information, the combined point cloud data separately.

An embodiment of the present application provides a device. The device includes a communication module, a memory, and one or more processors.

The communication module is configured to communicate between two communication nodes.

The memory is configured to store one or more programs.

The one or more programs, when executed by the one or more processors, cause the one or more processors to implement the method of any one of the preceding embodiments.

An embodiment of the present application provides a storage medium. The storage medium is configured to store a computer program which, when executed by a processor, implements the method of any one of the preceding embodiments.

DETAILED DESCRIPTION

Embodiments of the present application are described below in conjunction with drawings. The present application is described below in conjunction with the accompanying drawings of the embodiments. The examples given are only used to explain the present application and are not intended to limit the scope of the present application.

The autonomous driving scenario is used as an example. In the era of the 5th generation (5G) of mobile communication technology, as the data transmission speed is constantly accelerated, a more reliable automatic driving scheme may involve multi-party interconnection and cooperation. A dynamically traveling vehicle continuously perceives the surrounding environment to form a point cloud, the point cloud data are sent to the cloud, and the cloud, according to the existing point cloud data information, updates the point cloud data after comparing and parsing the data sent by all the vehicles at the current moment, and then sends the point cloud data to the vehicles after encoding the point cloud data required by different vehicles. In this process, if a vehicle uses the combine frame coding manner for multi-frame point cloud, the point cloud within a certain time interval may be transmitted to the cloud at one time. Similarly, the cloud can use the combine frame coding manner for multi-frame point cloud to transmit the point cloud within a certain time interval to the vehicle at one time, thereby improving the coding and transmission efficiency. After receiving the point cloud data, the cloud may preferentially decode geometric information and frame index information to obtain the split geometric information and send the split geometric information back to the vehicle after parsing the geometric information only. Similarly, during the driving process of a vehicle, the geometric information may be preferentially and quickly sent back to the cloud for marking processing to improve processing efficiency.

Figure 1:
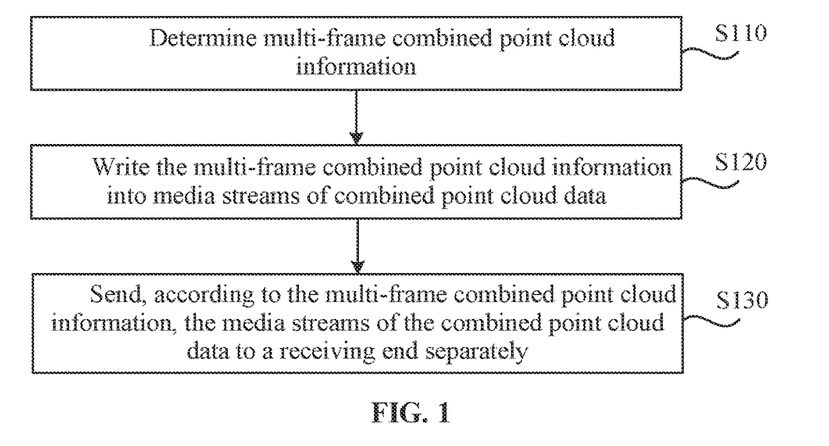
FIG. 1 is a flowchart of a data processing method according to an embodiment of the present application.

In an embodiment, FIG. 1 is a flowchart of a data processing method according to an embodiment of the present application. This embodiment may be implemented by a sending end. The sending end is used to send messages and/or streams. Meanwhile, the sending end may be a client or a server. The client may be a terminal side (for example, user equipment) or a network side (for example, a base station). As shown in FIG. 1, this embodiment includes S110 to S130.

S110: Multi-frame combined point cloud information is determined.

In an embodiment, the multi-frame combined point cloud information is used for indicating whether the original point cloud data uses the combine multi-frame coding manner and whether combined point cloud data uses different transmission manners and/or consumption manners after the combine multi-frame coding manner is used. The combined point cloud data refers to data obtained after the combine frame coding is performed on the original point cloud data corresponding to multi-frame images. In the embodiment, the consumption refers to, for a point cloud stream, the use, processing, decoding, or rendering and presentation after decoding.

In an embodiment, components of the combined point cloud data include geometric information after a combination and attribute information after the combination. The attribute information after the combination includes frame index information and non-frame index attribute information after the combination. In an embodiment, the components of the combined point cloud data may include geometric information after a combination and frame coding information after the combination, that is, non-frame index attribute information after the combination and other information are excluded. The geometric information is information describing the spatial position of each point in the point cloud. The attribute information is incidental information describing each point in the point cloud, and may be divided into different types according to the represented information content, such as color, reflectivity, or frame index of a point. Other information may be auxiliary, such as user-defined information. In an embodiment, the geometric information after the combination refers to information obtained after the combine frame coding is performed on the geometric information in the point cloud data. The attribute information after the combination refers to information obtained after the combine frame coding is performed on the attribute information in the point cloud data.

In an embodiment, the multi-frame combined point cloud information includes one of the following parameters: a combine multi-frame coding manner flag; a combined point cloud data transmission manner; and a combined point cloud data consumption manner. In the embodiments, the combine multi-frame coding manner flag is used for indicating whether the combine multi-frame coding manner is used. For example, when the combine multi-frame coding manner flag is 0, it represents that the original point cloud data does not use the combine multi-frame coding manner. When the combine multi-frame coding manner flag is 1, it represents that the original point cloud data use the combine multi-frame coding manner. The combined point cloud data transmission manner is used for representing the transmission priority of each component in the combined point cloud data. The combined point cloud data consumption manner is used for representing the processing priority of each component in the combined point cloud data. In the embodiments, the attribute information after the combination may be classified by information content, and different types of attribute information may be transmitted and/or consumed as a whole, or each type of attribute information may be transmitted and/or consumed independently.

In an embodiment, the operation of determining the multi-frame combined point cloud information includes one of the following:

The multi-frame combined point cloud information is determined according to preset configuration information.

The multi-frame combined point cloud information is determined according to receiving end request information, after a connection is established with a current channel and/or the receiving end.

The multi-frame combined point cloud information is determined according to the current channel information, after a connection is established with a current channel and/or the receiving end.

The multi-frame combined point cloud information is determined according to receiving end attribute information, after a connection is established with a current channel and/or the receiving end.

The multi-frame combined point cloud information is determined according to current channel information and receiving end attribute information, after a connection is established with a current channel and/or the receiving end.

In the embodiment, the multi-frame combined point cloud information may be acquired by the sending end from an external device. Alternatively, the multi-frame combined point cloud information may be configured directly by the sending end according to pre-configured preset configuration information of the sending end. Alternatively, the multi-frame combined point cloud information may be configured by the sending end according to preset configuration information carried in the receiving end request information. Alternatively, the multi-frame combined point cloud information may also be configured by the sending end according to the acquired current channel information and/or receiving end attribute information. In the embodiments, the operation of determining the multi-frame combined point cloud information according to the preset configuration information includes two cases. In the first case where the sending end establishes a connection with the current channel and/or the receiving end, the multi-frame combined point cloud information is determined according to the preset configuration information. In the second case where the sending end does not establish a connection with the current channel and/or the receiving end, the multi-frame combined point cloud information is determined according to the preset configuration information. The case where the sending end establishes the connection with the current channel and/or the receiving end refers to a case where the sending end performs media communication with the receiving end. The case where the sending end does not establish the connection with the current channel and/or the receiving end refers to a case where the sending end does not perform media communications with the receiving end.

In an embodiment, when the sending end directly configures the multi-frame combined point cloud information according to the preset configuration information, the multi-frame combined point cloud information may or may not use the combine multi-frame coding manner for the original point cloud data. Meanwhile, the combined point cloud data obtained after a combination may adopt the same transmission manner and/or consumption manner. Alternatively, the point cloud data obtained after the combine multi-frame coding manner is used may adopt different transmission manners and/or consumption manners. In the embodiments, the preset configuration information may include parameters such as a network condition and a device condition of the sending end, that is, the sending end configures the multi-frame combined point cloud information according to the device parameters of the sending end.

In an embodiment, when the sending end configures the multi-frame combined point cloud information according to receiving end request information, the multi-frame combined point cloud information may or may not use the combine multi-frame coding manner. In the case of using the combine multi-frame coding manner, the combined point cloud data obtained after the combination may adopt the same transmission manner and/or consumption manner. It is possible that the combined point cloud data, in the case of using the combine multi-frame coding manner, adopt different transmission manners and/or consumption manners.

In the embodiments, the sending end may statically configure the multi-frame combined point cloud information when establishing the connection with the current channel and/or the receiving end. Alternatively, the sending end may dynamically configure the multi-frame combined point cloud information according to the receiving end request information after the connection is established. Alternatively, the sending end may dynamically configure the multi-frame combined point cloud information according to the current channel information and/or receiving end attribute information after the connection is established. The current channel information and/or receiving end attribute information includes, but is not limited to, network conditions, user demands, device performance, and so on.

S120: The multi-frame combined point cloud information is written into media streams of combined point cloud data.

In the embodiments, the multi-frame combined point cloud information may be written into different parts of the media streams, such as a point cloud source data part in the media streams and a system layer data part in the media streams.

Different parameters in the multi-frame combined point cloud information may be written into the same part of the media streams as a whole or may be independently written into different parts of the media streams. Alternatively, several parameters may be combined and then separately written into different parts.

S130: According to the multi-frame combined point cloud information, the media streams of the combined point cloud data are sent to a receiving end separately.

In the embodiments, the media streams containing the multi-frame combined point cloud information are sent to the receiving end. In a practical communication process, the media streams of the combined point cloud data may be separately sent according to the multi-frame combined point cloud information. For example, high-priority information is sent first, and a more reliable channel may also be used for transmitting the high-priority information.

In an embodiment, the data processing method applied to the sending end also includes storing the combined point cloud data as a media file separately according to the multi-frame combined point cloud information.

In the embodiments, the media streams may store the combined point cloud data as the media file according to the multi-frame combined point cloud information. For example, the geometric information, frame index information, and non-frame index attribute information are independently placed at different positions in the media file to consume the geometric information and the frame index information independently.

In an embodiment, the combined point cloud data transmission manner includes one of the following: preferentially transmitting geometric information after a combination, and then transmitting attribute information after the combination; transmitting geometric information after a combination and attribute information after the combination simultaneously; preferentially transmitting frame index information and geometric information after a combination, and then transmitting non-frame index attribute information after the combination; preferentially transmitting geometric information after a combination and the non-frame index attribute information after the combination, and then transmitting the frame index information; or transmitting geometric information after a combination, non-frame index attribute information after the combination, and frame index information in sequence.

In an embodiment, the combined point cloud data consumption manner includes one of the following: preferentially consuming geometric information after a combination; preferentially consuming non-frame index attribute information after a combination; preferentially consuming geometric information after a combination and non-frame index attribute information after the combination; preferentially consuming frame index information and geometric information after a combination; or preferentially consuming frame index information.

In an embodiment, a combination of the combine multi-frame coding manner flag, the combined point cloud data transmission manner, and the combined point cloud data consumption manner is described. Illustratively, the following combinations may be included:

Manner one: The sending end adopts the combine multi-frame coding manner and preferentially transmits geometric information after a combination, and then transmits attribute information after the combination. The attribute information after the combination includes frame index information.

Manner two: The sending end adopts the combine multi-frame coding manner and is set to preferentially consuming geometric information after a combination. Then a flag of preferentially consuming the geometric information after the combination is set. The transmission manner of the geometric information after the combination includes the following: The geometric information after the combination and attribute information after the combination may be transmitted simultaneously; or the geometric information after the combination may be preferentially transmitted first and then the attribute information after the combination is transmitted; or the frame index information and geometric information after the combination may be preferentially transmitted first and then non-frame index attribute information after the combination is transmitted.

Manner three: The receiving end sends a request that geometric information after the combination is consumed first to the sending end. For example, the receiving end needs to preferentially display the geometric information after the combination, and the sending end adopts the combine multi-frame coding manner according to the request of the receiving end and sets the flag for preferentially consuming the geometric information after the combination. The transmission manner of the geometric information after the combination includes the following: The sending end may transmit geometric information after the combination and attribute information after the combination simultaneously. Alternatively, the sending end may transmit frame index information and geometric information after the combination first and then transmit non-frame index attribute information after the combination.

Manner four: When network conditions are stable, such as a high transmission rate, no bit error, and no packet loss, the sending end may directly send the original point cloud data to the receiving end without using the combine multi-frame coding manner; alternatively, the sending end may transmit geometric information after a combination and attribute information after the combination together to the receiving end when the combine multi-frame coding manner is used.

When the network conditions are unstable, such as an unstable transmission rate, a bit error, or packet loss, the sending end may use the combine multi-frame coding manner, and transmit geometric information after a combination first and then transmit attribute information after the combination; alternatively, geometric information after a combination is transmitted by using a channel with high reliability, and attribute information after the combination is transmitted by using a channel with low reliability.

Manner five: In the multi-frame point cloud data using the combine multi-frame coding manner, frame index information is one type of attribute information after a combination and is used in splitting the combined point cloud data into original multi-frame point cloud data. Therefore, the frame index information is consumed after the consumption of geometric information after a combination and/or the consumption of non-frame index attribute information after the combination, that is, the geometric information after the combination and/or the non-frame index attribute information after the combination is preferentially transmitted, and then the frame index information is transmitted. It is also possible to preferentially transmit geometric information after the combination, then transmit the non-frame index attribute information after the combination, and finally transmit the frame index information. It is also possible to transmit the frame index information and geometric information after the combination first and then transmit the non-frame index attribute information after the combination.

Manner six: The sending end may, according to the preset configuration information, user demands, channel conditions, or receiving end information, adopt different transmission priorities for different attribute information or adopt different transmission channels for different attribute information.

Manner seven: The sending end may, according to the preset configuration information, user demands, channel conditions, or receiving end information, choose to transmit or not transmit other information.

In an embodiment, correspondence between the multi-frame combined point cloud information and the combined point cloud data includes one of the following:

One piece of combined point cloud data corresponds to the multi-frame combined point cloud information.

Each component in the combined point cloud data corresponds to the multi-frame combined point cloud information separately.

One piece of combined point cloud data corresponds to at least one parameter in the multi-frame combined point cloud information, and each component in the combined point cloud data corresponds to at least one parameter in the multi-frame combined point cloud information separately.

In an embodiment, this embodiment describes an implementation of the multi-frame combined point cloud information in the preceding embodiments. The multi-frame combined point cloud information includes the following parameters: a combine multi-frame coding manner flag; a combined point cloud data transmission manner; and a combined point cloud data consumption manner. In the embodiments, the correspondence between the multi-frame combined point cloud information and the combined point cloud data is that a piece of combined point cloud data corresponds to the multi-frame combined point cloud information, that is, the respective multi-frame combined point cloud information is set for one piece of combined point cloud data. This correspondence is illustrated. Illustratively, the multi-frame combined point cloud information is implemented as follows:

```
aligned(8) class CombineFrameCodeInfo( )
{
    unsigned int(1) combine_frame_coding_enabled_flag;
    if(combine_frame_coding_enabled_flag){
        unsigned int(8) combine_frame_decoding_order;
        unsigned int(8) combine_frame_transfer priority;
    }
    else{
        bit(8) reserved = 0;
    }
}
``` combine_frame_coding_enabled_flag is used for representing the combine multi-frame coding manner flag. For example, 1 represents that the combine multi-frame coding manner is used, and 0 represents that the combine multi-frame coding manner is not used.

combine_frame_decoding_order is used for representing the consumption manner used for the combined point cloud data (that is, geometric information after a combination, attribute information, and other information), for example, the order of decoding and presentation. Illustratively, combine_frame_decoding_order equal to 0 represents that frame index information and geometric information after a combination are decoded and presented immediately after being received, and split multi-frame point cloud data are presented; and the split geometric information is supported to be consumed preferentially, the decoded and split geometric information is presented. combine_frame_decoding_order equal to 1 represents that decoding and presenting are performed immediately after geometric information after a combination is received, that is, the decoded and combined geometric information is presented. combine_frame_decoding_order equal to 2 represents that decoding and presenting are performed after all information is received, and multi-frame point cloud data with attribute information are presented, that is, decoded and split geometric information and non-frame index attribute information are presented. combine_frame_decoding_order equal to 3 represents that decoding and presenting are immediately performed after geometric information after a combination and non-frame index attribute information after the combination are received, that is, single-frame point cloud data of the decoded geometric information after the combination and the non-frame index attribute information after the combination is presented.

Figure 2:
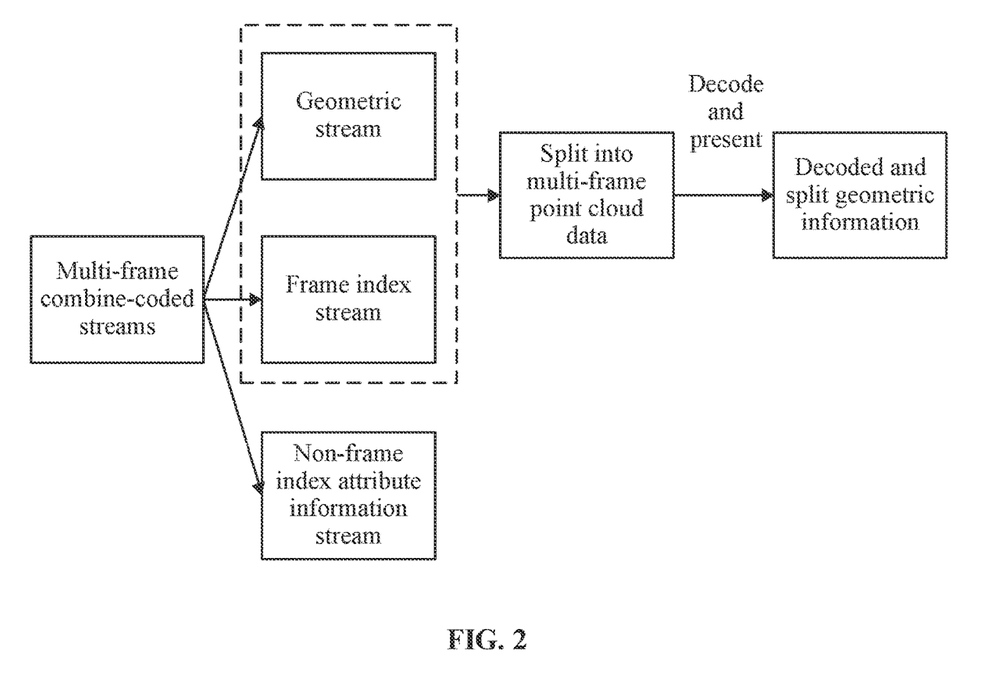
FIG. 2 is a diagram illustrating decoding and presentation of combined point cloud data according to an embodiment of the present application.

In an embodiment, FIG. 2 is a diagram illustrating decoding and presentation of combined point cloud data according to an embodiment of the present application. This embodiment illustrates the situation where combine_frame_decoding_order equals 0. As shown in FIG. 2, streams carrying combined point cloud data (that is, multi-frame combine-coded streams) are decoded, and a stream corresponding to geometric information after a combination (that is, a geometric stream) and a stream corresponding to frame index information (that is, a frame index stream) are decoded preferentially; then, the geometric information after the combination is split into geometric information of multi-frame point cloud data according to the frame index information, and the decoded and split geometric information is presented.

Figure 3:
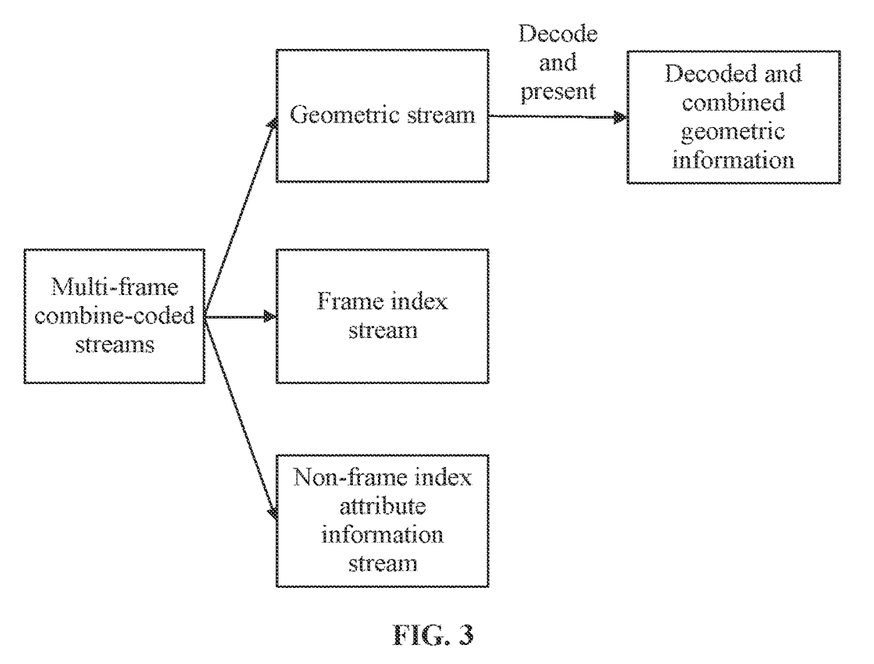
FIG. 3 is a diagram illustrating another decoding and presentation of combined point cloud data according to an embodiment of the present application.
Figure 4:
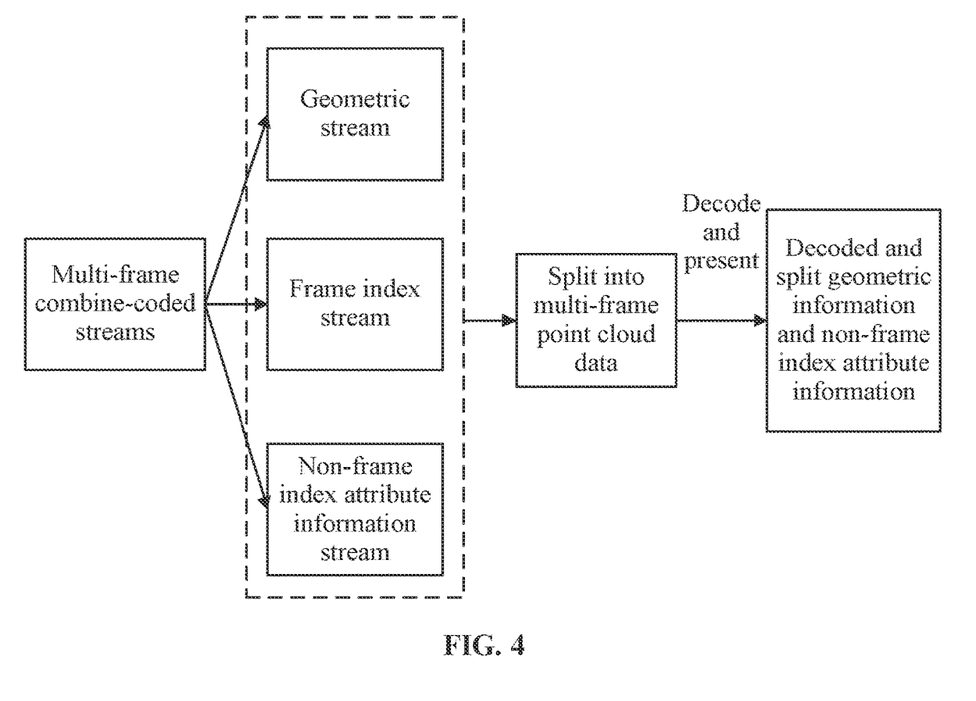
FIG. 4 is a diagram illustrating another decoding and presentation of combined point cloud data according to an embodiment of the present application.

In an embodiment, FIG. 3 is a diagram illustrating another decoding and presentation of combined point cloud data according to an embodiment of the present application. This embodiment illustrates the situation where combine_frame_decoding_order equals 1. As shown in FIG. 3, streams carrying the combined point cloud data are decoded, and a stream corresponding to geometric information after a combination is decoded preferentially to present the decoded and combined geometric information In an embodiment, FIG. 4 is a diagram illustrating another decoding and presentation of combined point cloud data according to an embodiment of the present application. This embodiment illustrates the situation where combine_frame_decoding_order equals 2. As shown in FIG. 4, streams carrying the combined point cloud data are decoded, decoding is performed after all information is received, and the decoded and split geometric information and non-frame index attribute information are presented.

Figure 5:
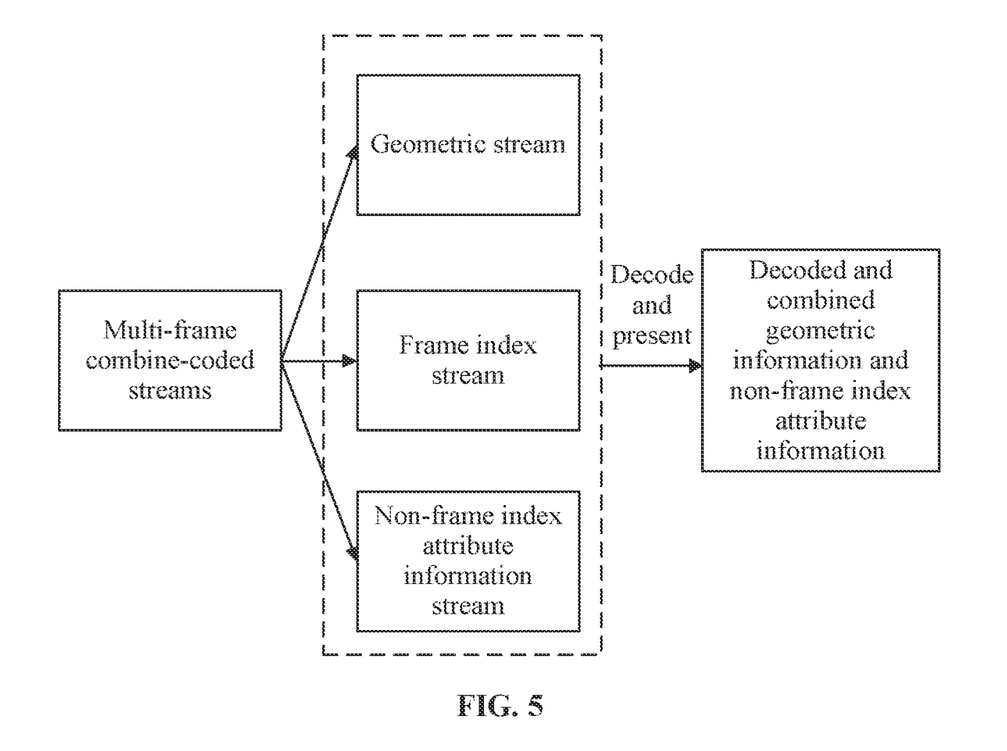
FIG. 5 is a diagram illustrating another situation where combined point cloud data are decoded and presented according to an embodiment of the present application.

In an embodiment, FIG. 5 is a diagram illustrating another decoding and presentation of combined point cloud data according to an embodiment of the present application. This embodiment illustrates the situation where combine_frame_decoding_order equals 3. As shown in FIG. 5, streams carrying combined point cloud data are decoded, geometric information after a combination and non-frame index attribute information after the combination are decoded and presented immediately after being received, and single-frame point cloud data of the decoded geometric information after a combination and the non-frame index attribute information after the combination are presented.

In embodiments, the non-frame index attribute information may not be taken as a whole, but be split into independent information according to the type of the non-frame index attribute information, and different decoding and presenting manners are set for the information. For example, color attribute information and geometric information may be preferentially decoded and presented together.

combine_frame_transfer_priority is the transmission order adopted for the combined point cloud data, that is, different values are used for representing different transmission orders. Table 1 is a schematic table of a combined point cloud data transmission manner provided by this embodiment of the present application. As shown in Table 1, in the case where combine_frame_transfer_priority equals 0, geometric information after a combination, frame index information, and attribute information after the combination are transmitted in sequence. In the case where combine_frame_transfer_priority equals 1, geometric information after a combination, attribute information after the combination, and frame index information are transmitted in sequence.

TABLE 1

Schematic table of a combined point cloud data transmission manner

| combine_frame_transfer_priority | Geometric Information | Frame Index Information | Attribute Information |
|---|---|---|---|
| 0 | First transmission | Second transmission | Third transmission |
| 1 | First transmission | Third transmission | Second transmission |

In the embodiments, the non-frame index attribute information may not be taken as a whole, but be split into independent information according to attribute types, and different transmission orders are set for the information. For example, color attribute information may be preferentially and independently transmitted.

In an embodiment, this embodiment describes an implementation of the multi-frame combined point cloud information in the preceding embodiments. The multi-frame combined point cloud information includes the following parameters: a combine multi-frame coding manner flag; a combined point cloud data transmission manner; and a combined point cloud data consumption manner. In the embodiments, the correspondence between the multi-frame combined point cloud information and the combined point cloud data is that each component in the combined point cloud data corresponds to the multi-frame combined point cloud information separately, that is, different components in the combined point cloud data have its respective multi-frame combined point cloud information. This correspondence is illustrated. Illustratively, the multi-frame combined point cloud information is implemented as follows:

```
aligned(8) class CombineFrameCodeSampleInfo( )
{
    unsigned int(1) combine_frame_coding_enabled_flag;
    if(combine_frame_coding_enabled_flag){
        unsigned int(8) combine_frame_sample_decoding_order;
        unsigned int(8) combine_frame_sample_transfer_priority;
    }
    else{
        bit(8) reserved = 0;
    }
}
``` combine_frame_coding_enabled_flag represents the combine multi-frame coding manner flag. For example, 1 represents that the combine multi-frame coding manner is used, and 0 represents that the combine multi-frame coding manner is not used.

combine_frame_sample_decoding_order represents the consumption manner used for the combined point cloud data (that is, geometric information after a combination, attribute information, and other information), for example, the order of decoding and presentation. Illustratively, when combine_frame_sample_decoding_order is 0, it represents first decoding and presenting, that is, decoding and presenting are performed immediately upon reception. The higher the value is, the later the decoding and presenting order is. Different information may adopt different decoding and presenting orders or the same decoding order. For example, if frame index information and geometric information after a combination are first decoded and presented, combine_frame_sample_decoding_order of the frame index information and combine_frame_sample_decoding_order of the geometric information after a combination are each set to 0, and combine_frame_sample_decoding_order of non-frame index attribute information after the combination is set to 1, as shown in FIG. 2.

combine_frame_sample_transfer_priority is the transmission order adopted for the information of combined point cloud data. Different values are used for representing different transmission orders. When combine_frame_sample_transfer_priority is 0, it represents that the transmission priority is the highest. The higher the value is, the lower the priority is. For example, combine_frame_sample_transfer_priority of geometric information after a combination is configured to be 0, combine_frame_sample_transfer_priority of frame index information is configured to be 1, and combine_frame_sample_transfer_priority of non-frame index attribute information after the combination is configured to be 2. Alternatively, combine_frame_sample_transfer_priority of the non-frame index attribute information after the combination may be configured independently according to the type. For example, combine_frame_sample_transfer_priority of color information is configured to be 3.

In an embodiment, this embodiment describes an implementation of the multi-frame combined point cloud information in the preceding embodiments. The multi-frame combined point cloud information includes the following parameters: a combine multi-frame coding manner flag; a combined point cloud data transmission manner; and a combined point cloud data consumption manner. In the embodiment, the correspondence between the multi-frame combined point cloud information and the combined point cloud data is that a piece of combined point cloud data corresponds to at least one parameter in the multi-frame combined point cloud information, and each component in the combined point cloud data corresponds to at least one parameter in the respective multi-frame combined point cloud information separately. In other words, a part of multi-frame combined point cloud information may be configured for one piece of combined point cloud data as a whole and another part of the multi-frame combined point cloud information may be configured for different components in the combined point cloud data. This correspondence is illustrated. Illustratively, the multi-frame combined point cloud information is implemented as follows:

```
aligned(8) class CombineFrameCodeSampleEntry( )
{
    unsigned int(1) combine_frame_coding_enabled_flag;
    if(combine_frame_coding_enabled_flag){
        unsigned int(8) combine_frame_decoding_order;
        unsigned int(8) combine_frame_sample_transfer_priority;
    }
    else{
        bit(8) reserved = 0;
    }
}
``` combine_frame_coding_enabled_flag is used for representing the combine multi-frame coding manner flag. For example, 1 represents that the combine multi-frame coding manner is used, and 0 represents that the combine multi-frame coding manner is not used.

combine_frame_decoding_order is used for representing the consumption manner used for the combined point cloud data (that is, geometric information after a combination, attribute information, and other information), for example, the order of decoding and presentation. Illustratively, combine_frame_decoding_order equal to 0 represents that frame index information and geometric information after a combination are decoded and presented immediately after being received, split multi-frame point cloud data are presented, and the geometric information is supported to be consumed preferentially. combine_frame_decoding_order equal to 1 represents that geometric information after a combination is decoded and presented immediately after being received, and the decoded and combined geometric information is presented. combine_frame_decoding_order equal to 2 represents that decoding and presenting are performed after all information is received, and multi-frame point cloud data with attribute information are presented. combine_frame_decoding_order equal to 3 represents that decoding and presenting are immediately performed after geometric information after a combination and non-frame index attribute information after the combination are received, and combined and decoded single-frame point cloud data with attribute information are presented.

The non-frame index attribute information after a combination may not be taken as a whole, but be split into different types of independent information, and different decoding and presenting manners are configured for the information. For example, color information and geometric information may be preferentially decoded and presented together.

combine_frame_sample_transfer_priority is used for representing the transmission order adopted for the combined point cloud data. Different values are used for representing different transmission orders. Illustratively, when combine_frame_sample_transfer_priority is 0, it represents the highest transmission priority. The higher the value is, the lower the priority is. For example, combine_frame_sample_transfer_priority of geometric information after a combination is configured to be 0, combine_frame_sample_transfer_priority of frame index information is configured to be 1, and combine_frame_sample_transfer_priority of non-frame index attribute information after the combination is configured to be 2. Of course, combine_frame_sample_transfer_priority of non-frame index attribute information after a combination may be configured independently. Illustratively, combine_frame_sample_transfer_priority of color information after the combination is configured to be 3.

In an embodiment, writing the multi-frame combined point cloud information into the media streams includes one of the following:

The multi-frame combined point cloud information is written into track information in a media file.

The multi-frame combined point cloud information is written into supplemental enhancement information of the combined point cloud data.

The multi-frame combined point cloud information is written into video usability information of the combined point cloud data.

In an embodiment, this embodiment writes the multi-frame combined point cloud information into the media encapsulation file according to different demands for consuming and/or transmitting the combined point cloud data. Illustratively, this embodiment encapsulates the combined point cloud data by adopting the International Organization for Standardization/International Electrotechnical Commission 14496-12 International Organization for Standardization Base Media File Format (ISO/IEC 14496-12 ISO BMFF). This encapsulation manner is an implementation of multi-frame combined point cloud information, but the implementation is not limited to such an encapsulation manner.

In an embodiment, the multi-frame combined point cloud information includes one of the following parameters: a combine multi-frame coding manner flag; a combined point cloud data transmission manner; and a combined point cloud data consumption manner.

In the embodiments, geometric information after a combination and attribute information after the combination in the combined point cloud data are separately stored in different media tracks. The data type of the combined point cloud data, such as the geometric information after a combination and the frame index information, stored in the track is identified by defining sample entries of different types (for example, using a four-word code identifier for each type). Moreover, indication information is given in the sample entry to characterize the transmission manner and/or consumption manner used for the combined point cloud data (that is, combine-coded geometric information, attribute information, and other information). In an embodiment, the combined point cloud data are stored in samples of the media track. Illustratively, the indication information in the media track is implemented as follows:

```
aligned(8) class DecodeAndTransferInfo( )
{
    unsigned int(1) decoding_order_flag;
    unsigned int(1) transfer_priority_flag;
    if(decoding_order_flag)
        unsigned int(8) sample_decoding_order;
    if(transfer_priority_flag)
        unsigned int(8) sample_transfer priority;
    bit(6) reserved = 0;
}
``` decoding_order_flag is used for indicating a flag of the decoding and presenting order of samples in the media track. For example, 1 represents decoding and presenting in sequence, and 0 represents decoding and presenting in a default manner.

sample_decoding_order is used for representing the decoding and presenting order of samples in the media track. Illustratively, 0 represents first decoding and presenting, that is, decoding and presenting are performed immediately upon reception. The higher the value is, the later the decoding and presenting order is. Different types of information may adopt different decoding and presenting orders or the same decoding and presenting order. For example, if frame index information and geometric information after a combination are first decoded and presented, sample_decoding_order of the frame index information and sample_decoding_order of the geometric information after the combination are each configured to be 0, and sample_decoding_order of non-frame index attribute information after the combination is configured to be 1, as shown in FIG. 2.

transfer_priority_flag is used for indicating a flag of the transmission order of samples in the media track. For example, 1 represents that the samples are transmitted in sequence, and 0 represents that the samples are transmitted in a default manner.

sample_transfer_priority is used for indicating the transmission order of samples in the media track. Different values are used for representing different transmission orders. Illustratively, 0 represents the highest transmission priority. The higher the value is, the lower the priority is. For example, sample_transfer_priority of geometric information is configured to be 0, sample_transfer_priority of frame index information is configured to be 1, and sample_transfer_priority of non-frame index attribute information after a combination is configured to be 2. Of course, sample_transfer_priority of different types of non-frame index attribute information after the combination may be configured independently. For example, sample_transfer_priority of color information is configured to be 3.

In the embodiments, if the point cloud data adopt the combine multi-frame coding manner, the media file of the combined point cloud data needs to give indication information for indicating that the point cloud data in this media file are encoded in the combine multi-frame coding manner. Illustratively, the indication information for the combine frame coding of the multi-frame point cloud data is represented as follows:

combine_frame_coding_enabled_flag represents the combine multi-frame coding manner flag. For example, 1 represents that the combine multi-frame coding manner is used, and 0 represents that the combine multi-frame coding manner is not used.

In an embodiment, the indication information for the combine frame coding of the multi-frame point cloud data may be indicated in the file level, for example, indicated in relevant MediaHeaderBox under MediaInformationBox or indicated in other data boxes of the file level.

In an embodiment, the indication information for the combine frame coding of the multi-frame point cloud data may also be indicated in the media track level, for example, indicated in a corresponding sample entry.

In the embodiments, geometric information and attribute information of different types in the combined point cloud data may be stored in one or more different media. For example, two different types of attribute information are stored in the same media track, and the combined point cloud data in this media track uses the same transmission manner and/or consumption manner.

The consumption manner and/or transmission manner of the combined point cloud data may be changed according to different scenarios or demands. Then, a dynamic timing metadata track may be used for dynamically setting the consumption manner and/or transmission manner of the combined point cloud data in one or more media tracks. 'dydt' is used for identifying the dynamic timing metadata track describing the dynamic consumption manner and/or transmission manner of the combined point cloud data. An implementation is as follows:

```
aligned(8) class DynamicDecodingAndTransferSampleEntry( )
    extends MetadataSampleEntry ('dydt') {
    DecodeAndTransferInfo( );
        unsigned int(1) dynamic_order_flag;
        unsigned int(1) dynamic_order_flag;
}
```

In the embodiments, DynamicDecodingAndTransferSample ( ) is used for indicating the consumption manner and/or transmission manner of each sample in the media track that stores the combined point cloud data and is referenced by the dynamic timing metadata track. An implementation is as follows:

```
aligned(8) class DynamicDecodingAndTransferSample( ){
    if(dynamic_order_flag)
        unsigned int(8) sample_decoding_order;
    if(dynamic_priority_flag)
        unsigned int(8) sample_transfer_priority;
}
``` dynamic_order_flag indicates that the consumption manner of a sample dynamically changes. 0 represents that the consumption manner does not change, and 1 represents that the consumption manner changes.

sample_transfer_priority indicates that the transmission manner of the sample dynamically changes. 0 represents that the transmission manner does not change, and 1 represents that the transmission manner changes.

In an embodiment, this embodiment describes writing the multi-frame combined point cloud information into the media streams. In the embodiment, writing the multi-frame combined point cloud information into the media streams includes writing the multi-frame combined point cloud information into supplemental enhancement information (SEI) of the combined point cloud data. Illustratively, an implementation of writing the multi-frame combined point cloud information into the SEI of the combined point cloud data includes the following:

| | Descriptor |
|---|---|
| sei_payload( payloadType, payloadSize ) { | |
| ...... | |
|     if( payloadType = = COMBINE_CODE_FRAME_INFO) { | |
| ...... | |
|     combine_frame_coding_info( payloadSize ); | |
| ...... | |
|     } | |
| } | |

In the embodiments, an implementation of combine_frame_coding_info ( ) may be as follows:

| | Descriptor |
|---|---|
| combine_frame_coding_info( ) { | |
| ...... | |
| combine_frame_coding_enabled_flag | u(1) |
| if(combine_frame_coding_enabled_flag){ | |
|   combine_frame_decoding_order | u(8) |
|   combine_frame_transfer_priority | u(8) |
|   } | |
| ...... | |
| } | |

In the embodiment, combine_frame_coding_info( ) may be implemented in any form or a combination form in any of the preceding embodiments, which is not repeated herein.

In an embodiment, this embodiment describes writing the multi-frame combined point cloud information into the media streams. In the embodiment, writing the multi-frame combined point cloud information into the media streams includes writing the multi-frame combined point cloud information into video usability information (VUI) of the combined point cloud data. Illustratively, an implementation of writing the multi-frame combined point cloud information into the VUI of the combined point cloud data includes the following:

| | Descriptor |
|---|---|
| vui_parameters( ) { | |
| ...... | |
|     combine_frame_coding_info_flag | u(1) |
|     if(combine_frame_coding_info_flag) { | |
|     ...... | |
|         combine_frame_coding_info( ); | |
|     ...... | |
|     } | |
| } | |

In the embodiment, when the value of combine_frame_coding_info_flag equals 1, it represents that multi-frame combined point cloud information exists subsequently. combine_frame_coding_info ( ) may be any form or combination form of the preceding embodiments.

Figure 6:
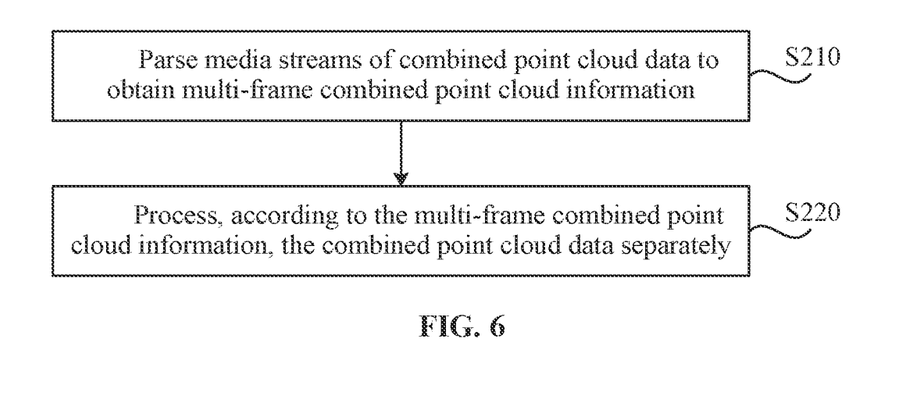
FIG. 6 is a flowchart of another data processing method according to an embodiment of the present application.

In an embodiment, FIG. 6 is a flowchart of another data processing method according to an embodiment of the present application. This embodiment may be implemented by a receiving end. The receiving end is used to receive messages and/or streams. Meanwhile, the receiving end may be a client or a server. The client may be a terminal side (for example, user equipment) or a network side (for example, a base station). As shown in FIG. 6, this embodiment includes S210 and S220.

S210: Media streams of combined point cloud data are parsed to obtain multi-frame combined point cloud information.

In embodiments, for the explanation of the combined point cloud data and the multi-frame combined point cloud information, reference is made in the description of the preceding embodiments, and details are not repeated herein.

In the embodiments, after acquiring the media streams of the combined point cloud data, the receiving end parses the media streams to acquire the multi-frame combined point cloud information. In the embodiment, if the multi-frame combined point cloud information exists in the media streams, the multi-frame combined point cloud information may be extracted from the media stream. In an embodiment, the multi-frame combined point cloud information includes one of the following parameters: a combine multi-frame coding manner flag; a combined point cloud data transmission manner; and a combined point cloud data consumption manner. The combine multi-frame coding manner flag is used for characterizing whether the original point cloud data uses the combine multi-frame coding manner. If the combine multi-frame coding manner is used, the flag indicates whether the combined point cloud data (that is, geometric information after a combination, attribute information, and other information) uses different transmission manners and/or consumption manners.

In the embodiments, all parameters in the multi-frame combined point cloud information may be separately stored at different positions in the media stream or the media file or may be stored at the same position in the media data or the media file.

In the embodiments, for the implementation of the multi-frame combined point cloud information, reference is made in the description of the preceding embodiments, and details are not repeated herein.

S220: According to the multi-frame combined point cloud information, the combined point cloud data are processed separately.

In the embodiments, when the media streams are processed, whether the combine multi-frame coding manner is used is the first to be determined. If the combine multi-frame coding manner is used, the media data are processed according to the transmission manners and/or consumption manners adopted for the geometric information after a combination, attribute information, and other information in the multi-frame combined point cloud information. For example, the multi-frame combined point cloud information indicates that the geometric information is preferentially decoded and presented, and the geometric information may be acquired from the media stream or the media file to be parsed first. If the frame index information is not indicated as preferentially decoding and presenting, the geometric information in the combined point cloud data is directly presented after being decoded. If the frame index information is indicated as preferentially decoding and presenting, the frame index information is acquired and parsed, the geometric information after a multi-frame combination is decoded and split according to the frame index information, and the split geometric information is presented.

The multi-frame combined point cloud information may be ignored and the following conventional processing is performed on the media streams: All the combined point cloud data is acquired; geometric information, frame index information, non-frame index attribute information, and other information are parsed separately; the geometric information, non-frame index attribute information, and other information are split according to the frame index information, and the split point cloud information is presented separately.

In an embodiment, before the media streams of combined point cloud data are parsed to obtain multi-frame combined point cloud information, the method also includes receiving the media streams of combined point cloud data sent by a sending end.

In an embodiment, before the media streams of combined point cloud data are parsed to obtain multi-frame combined point cloud information, the method also includes reading a locally pre-stored media file of the combined point cloud data. In an embodiment, in the case where the receiving end directly acquires the combined point cloud data by reading the media file, a process of parsing the media streams of the combined point cloud data refers to a process of parsing a media file storing the combined point cloud data.

In an embodiment, components of the combined point cloud data include geometric information after a combination and attribute information after the combination. The attribute information after the combination includes frame index information and non-frame index attribute information after the combination.

In an embodiment, the combined point cloud data transmission manner includes one of the following: preferentially transmitting geometric information after a combination, and then transmitting attribute information after the combination; transmitting geometric information after a combination and attribute information after the combination simultaneously; preferentially transmitting frame index information and geometric information after a combination, and then transmitting non-frame index attribute information after the combination; preferentially transmitting geometric information after a combination and the non-frame index attribute information after the combination, and then transmitting the frame index information; or transmitting geometric information after a combination, non-frame index attribute information after the combination, and frame index information in sequence.

In an embodiment, the combined point cloud data consumption manner includes one of the following: preferentially consuming geometric information after a combination; preferentially consuming non-frame index attribute information after a combination; preferentially consuming geometric information after a combination and non-frame index attribute information after the combination; preferentially consuming frame index information and geometric information after a combination; or preferentially consuming frame index information.

In an embodiment, correspondence between the multi-frame combined point cloud information and the combined point cloud data includes one of the following:

The multi-frame combined point cloud information corresponds to one piece of the combined point cloud data.

The multi-frame combined point cloud information corresponds to each component in the combined point cloud data separately.

At least one parameter in the multi-frame combined point cloud information corresponds to one piece of the combined point cloud data, and at least one parameter in the multi-frame combined point cloud information corresponds to each component in the combined point cloud data separately.

Figure 7:
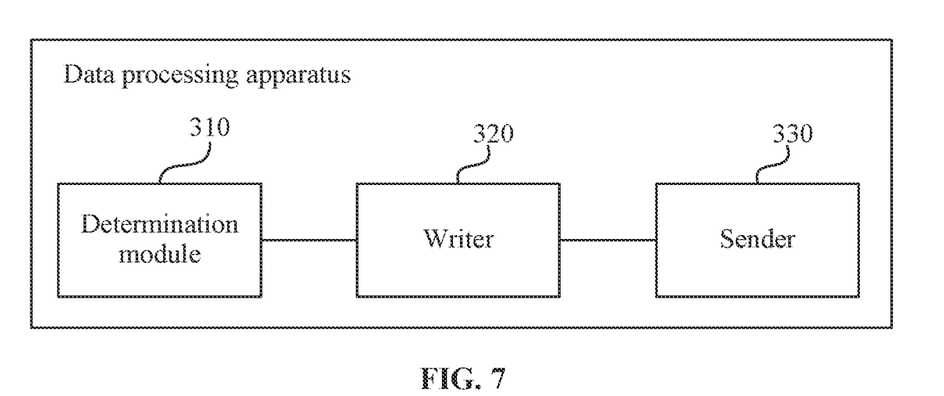
FIG. 7 is a block diagram of a data processing apparatus according to an embodiment of the present application.

In an embodiment, FIG. 7 is a block diagram of a data processing apparatus according to an embodiment of the present application. This embodiment is implemented by a sending end. As shown in FIG. 7, the data processing apparatus in this embodiment includes a determination module 310, a writer 320, and a sender 330.

The determination module 310 is configured to determine multi-frame combined point cloud information.

The writer 320 is configured to write the multi-frame combined point cloud information into media streams of combined point cloud data.

The sender 330 is configured to send, according to the multi-frame combined point cloud information, the media streams of the combined point cloud data to a receiving end separately.

In an embodiment, the data processing apparatus applied to the sending end also includes a memory configured to store the combined point cloud data as a media file separately according to the multi-frame combined point cloud information.

In an embodiment, the multi-frame combined point cloud information includes one of the following parameters: a combine multi-frame coding manner flag; a combined point cloud data transmission manner; and a combined point cloud data consumption manner.

In an embodiment, the determination module 310 includes one of the following:

The multi-frame combined point cloud information is determined according to preset configuration information.

According to receiving end request information, the multi-frame combined point cloud information is determined after a connection is established with a current channel and/or the receiving end.

According to current channel information, the multi-frame combined point cloud information is determined after a connection is established with a current channel and/or the receiving end.

According to receiving end attribute information, the multi-frame combined point cloud information is determined after a connection is established with a current channel and/or the receiving end.

According to the current channel information and receiving end attribute information, the multi-frame combined point cloud information is determined after a connection is established with a current channel and/or the receiving end.

In an embodiment, components of the combined point cloud data include geometric information after a combination and attribute information after the combination. The attribute information after the combination includes frame index information and non-frame index attribute information after the combination.

In an embodiment, the combined point cloud data transmission manner includes one of the following: preferentially transmitting geometric information after a combination, and then transmitting attribute information after the combination; transmitting geometric information after a combination and attribute information after the combination simultaneously; preferentially transmitting frame index information and geometric information after a combination, and then transmitting non-frame index attribute information after the combination; preferentially transmitting geometric information after a combination and the non-frame index attribute information after the combination, and then transmitting the frame index information; or transmitting geometric information after a combination, non-frame index attribute information after the combination, and frame index information in sequence.

In an embodiment, the combined point cloud data consumption manner includes one of the following: preferentially consuming geometric information after a combination; preferentially consuming non-frame index attribute information after a combination; preferentially consuming geometric information after a combination and non-frame index attribute information after the combination; preferentially consuming frame index information and geometric information after a combination; or preferentially consuming frame index information.

In an embodiment, correspondence between the multi-frame combined point cloud information and the combined point cloud data includes one of the following:

The multi-frame combined point cloud information corresponds to one piece of the combined point cloud data.

The multi-frame combined point cloud information corresponds to each component in the combined point cloud data separately.

At least one parameter in the multi-frame combined point cloud information corresponds to one piece of the combined point cloud data, and at least one parameter in the multi-frame combined point cloud information corresponds to each component in the combined point cloud data separately.

In an embodiment, writing the multi-frame combined point cloud information into the media streams includes one of the following:

The multi-frame combined point cloud information is written into track information in a media file.

The multi-frame combined point cloud information is written into supplemental enhancement information of the combined point cloud data.

The multi-frame combined point cloud information is written into video usability information of the combined point cloud data.

The data processing apparatus provided in this embodiment is configured to perform the data processing method of the embodiment shown in FIG. 1. The implementation principles and technical effects of the data processing apparatus provided in this embodiment are similar and are not repeated here.

Figure 8:
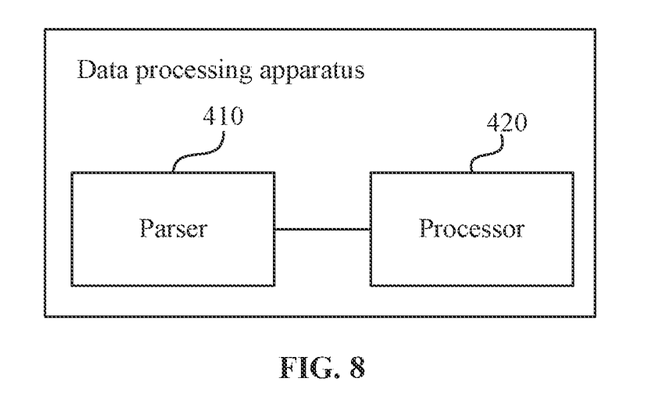
FIG. 8 is a block diagram of another data processing apparatus according to an embodiment of the present application.

In an embodiment, FIG. 8 is a block diagram of another data processing apparatus according to an embodiment of the present application. This embodiment is implemented by a receiving end. As shown in FIG. 8, the data processing apparatus in this embodiment includes a parser 410 and a processor 420.

The parser 410 is configured to parse media streams of combined point cloud data to obtain multi-frame combined point cloud information.

The processor 420 is configured to process, according to the multi-frame combined point cloud information, the combined point cloud data separately.

In an embodiment, the data processing apparatus applied to the receiving end also includes a receiver. The receiver is configured to receive the media streams of combined point cloud data sent by a sending end before the media streams of combined point cloud data are parsed to obtain the multi-frame combined point cloud information.

In an embodiment, the data processing apparatus applied to the receiving end also includes a reader. The reader is configured to read a locally pre-stored media file of the combined point cloud data before the media streams of combined point cloud data are parsed to obtain the multi-frame combined point cloud information.

In an embodiment, the multi-frame combined point cloud information includes one of the following parameters: a combine multi-frame coding manner flag; a combined point cloud data transmission manner; and a combined point cloud data consumption manner.

In an embodiment, components of the combined point cloud data include geometric information after a combination and attribute information after the combination. The attribute information after the combination includes frame index information and non-frame index attribute information after the combination.

In an embodiment, the combined point cloud data transmission manner includes one of the following: preferentially transmitting geometric information after a combination, and then transmitting attribute information after the combination; transmitting geometric information after a combination and attribute information after the combination simultaneously; preferentially transmitting frame index information and geometric information after a combination, and then transmitting non-frame index attribute information after the combination; preferentially transmitting geometric information after a combination and the non-frame index attribute information after the combination, and then transmitting the frame index information; or transmitting geometric information after a combination, non-frame index attribute information after the combination, and frame index information in sequence.

In an embodiment, the combined point cloud data consumption manner includes one of the following: preferentially consuming geometric information after a combination; preferentially consuming non-frame index attribute information after a combination; preferentially consuming geometric information after a combination and non-frame index attribute information after the combination; preferentially consuming frame index information and geometric information after a combination; or preferentially consuming frame index information.

In an embodiment, correspondence between the multi-frame combined point cloud information and the combined point cloud data includes one of the following:

One piece of combined point cloud data corresponds to the multi-frame combined point cloud information.

Each component in the combined point cloud data corresponds to the multi-frame combined point cloud information separately.

One piece of combined point cloud data corresponds to at least one parameter in the multi-frame combined point cloud information, and each component in the combined point cloud data corresponds to at least one parameter in the multi-frame combined point cloud information separately.

The data processing apparatus provided in this embodiment is configured to perform the data processing method of the embodiment shown in FIG. 6. The implementation principles and technical effects of the data processing apparatus provided in this embodiment are similar and are not repeated here.

Figure 9:
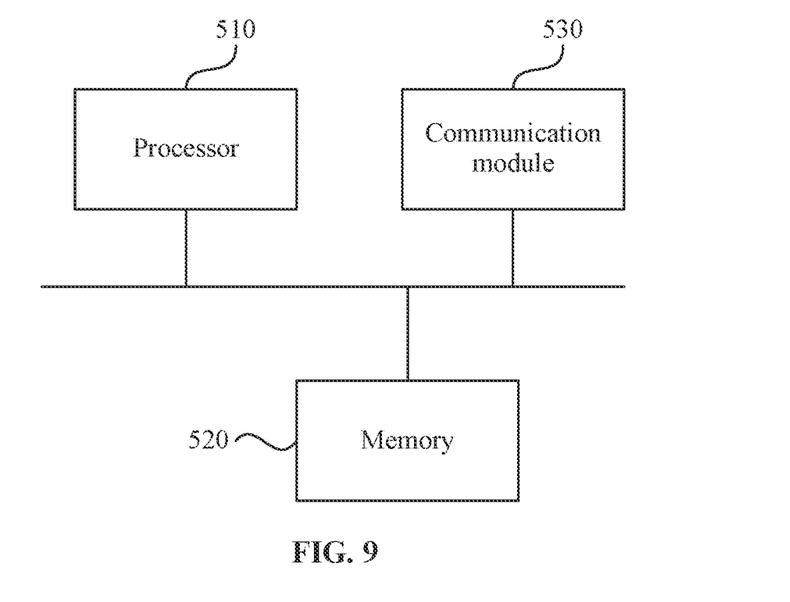
FIG. 9 is a diagram illustrating the structure of a communication node according to an embodiment of the present application.

FIG. 9 is a diagram illustrating the structure of a communication node according to an embodiment of the present application. As shown in FIG. 9, the communication node provided in the present application includes a processor 510, a memory 520, and a communication module 530. One or more processors 510 may be disposed in the communication node. FIG. 9 uses one processor 510 as an example. One or more memories 520 may be disposed in the communication node. FIG. 9 uses one memory 520 as an example. The processor 510, the memory 520, and the communication module 530 in the communication node may be connected by a bus or in other manners. FIG. 9 uses a connection by the bus as an example. In this embodiment, the communication node is a sending end. The sending end may be a client or a server. The client may be a terminal side (for example, user equipment) or a network side (for example, a base station). In the embodiments, the communication node may also be a device in video usability, such as a mobile phone, a computer, a server, a settop box, a portable mobile terminal, a digital video camera, and a television broadcasting system device.

As a computer-readable storage medium, the memory 520 may be configured to store software programs, computer-executable programs, and modules, such as program instructions/modules (for example, a determination module 310, a writer 320, and a sender 330 in a data processing apparatus) corresponding to the communication node in any embodiment of the present application. The memory 520 may include a program storage region and a data storage region, where the program storage region may store an operating system and an application program required by at least one function, and the data storage region may store data or the like created according to the use of the communication node. Additionally, the memory 520 may include a high-speed random-access memory and may also include a nonvolatile memory such as at least one disk memory, flash memory, or another nonvolatile solid-state memory. In some examples, the memory 520 may further include memories located remotely relative to the processor 510, and these remote memories may be connected to the communication node via a network. Examples of the preceding network include, but are not limited to, the Internet, an intranet, a local area network, a mobile communication network, and a combination thereof.

The communication module 530 is configured to communicate between two communication nodes.

The preceding communication node may be configured to perform the data processing method applied to the sending end provided by any preceding embodiment and has corresponding functions and effects.

In an embodiment, in the case where the communication node is the receiving end, the preceding communication node may be configured to execute the data processing method applied to the receiving end provided by any preceding embodiment and has corresponding functions and effects.

The embodiments of the present application also provide a storage medium including computer-executable instructions which, when executed by a computer processor, are configured to execute a data processing method applied to the sending end. The method includes determining multi-frame combined point cloud information; writing the multi-frame combined point cloud information into media streams of combined point cloud data; and sending, according to the multi-frame combined point cloud information, the media streams of the combined point cloud data to a receiving end separately. The storage medium may be non-transitory.

The embodiments of the present application also provide a storage medium including computer-executable instructions which, when executed by a computer processor, are configured to execute a data processing method applied to the receiving end. The method includes parsing media streams of combined point cloud data to obtain multi-frame combined point cloud information and processing the combined point cloud data separately according to the multi-frame combined point cloud information. The storage medium may be non-transitory.

It is to be understood by those skilled in the art that the term "user equipment" covers any suitable type of wireless user equipment, for example, a mobile phone, a portable data processing apparatus, a portable web browser, or a vehicle-mounted mobile station.

Generally speaking, various embodiments of the present application may be implemented in hardware or special-purpose circuits, software, logic, or any combination thereof. For example, some aspects may be implemented in hardware while other aspects may be implemented in firmware or software executable by a controller, a microprocessor, or another calculation apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, state setting data, or source or object codes written in any combination of one or more programming languages.

A block diagram of any logic flow among the drawings of the present application may represent program steps, may represent interconnected logic circuits, modules, and functions, or may represent a combination of program steps with logic circuits, modules and functions. Computer programs may be stored in a memory. The memory may be of any type suitable for a local technical environment and may be implemented using any suitable data storage technology such as, but not limited to, a read-only memory (ROM), a random-access memory (RAM), or an optical memory device and system (a digital video disc (DVD) or a compact disc (CD)). Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A data processing method, comprising:
   determining multi-frame combined point cloud information;
   writing the multi-frame combined point cloud information into media streams of combined point cloud data; and
   sending, according to the multi-frame combined point cloud information, the media streams of the combined point cloud data to a receiving end separately;
   wherein the multi-frame combined point cloud information comprises one of the following parameters: a combined point cloud data transmission manner; and a combined point cloud data consumption manner;
   wherein the combined point cloud data transmission manner comprises one of the following: preferentially transmitting geometric information after a combination, and then transmitting attribute information after the combination; simultaneously transmitting geometric information after a combination and attribute information after the combination; preferentially transmitting frame index information and geometric information after a combination, and then transmitting non-frame index attribute information after the combination; preferentially transmitting geometric information after a combination and non-frame index attribute information after the combination, and then transmitting frame index information; or transmitting geometric information after a combination, non-frame index attribute information after the combination, and frame index information in sequence; and
   wherein the combined point cloud data consumption manner comprises one of the following: preferentially consuming geometric information after a combination; preferentially consuming non-frame index attribute information after a combination; preferentially consuming geometric information after a combination and non-frame index attribute information after the combination; preferentially consuming frame index information and geometric information after a combination; or preferentially consuming frame index information.

2. The method of claim 1, further comprising:
   storing, according to the multi-frame combined point cloud information, the combined point cloud data as a media file separately.

3. The method of claim 2, wherein writing the multi-frame combined point cloud information into the media streams of the combined point cloud data comprises one of the following:
   writing the multi-frame combined point cloud information into track information in a media file;
   writing the multi-frame combined point cloud information into supplemental enhancement information of the combined point cloud data; or
   writing the multi-frame combined point cloud information into video usability information of the combined point cloud data.

4. The method of claim 1, wherein determining the multi-frame combined point cloud information comprises one of the following:
   determining, according to preset configuration information, the multi-frame combined point cloud information;
   determining, according to receiving end request information, the multi-frame combined point cloud information after a connection is established with at least one of a current channel or the receiving end;
   determining, according to current channel information, the multi-frame combined point cloud information after a connection is established with at least one of a current channel or the receiving end;

determining, according to receiving end attribute information, the multi-frame combined point cloud information after a connection is established with at least one of a current channel or the receiving end; or determining, according to current channel information and attribute information of the receiving end, the multi-frame combined point cloud information after a connection is established with at least one of a current channel or the receiving end.

5. The method of claim 4, wherein writing the multi-frame combined point cloud information into the media streams of the combined point cloud data comprises one of the following:

writing the multi-frame combined point cloud information into track information in a media file;

writing the multi-frame combined point cloud information into supplemental enhancement information of the combined point cloud data; or writing the multi-frame combined point cloud information into video usability information of the combined point cloud data.

6. The method of claim 1, wherein components of the combined point cloud data comprise: geometric information after a combination and attribute information after the combination; wherein the attribute information after the combination comprises frame index information and non-frame index attribute information after the combination.

7. The method of claim 1, wherein correspondence between the multi-frame combined point cloud information and the combined point cloud data comprises one of the following:

one piece of the combined point cloud data corresponding to the multi-frame combined point cloud information;

each component in the combined point cloud data corresponding to the multi-frame combined point cloud information separately; or one piece of the combined point cloud data corresponding to at least one parameter in the multi-frame combined point cloud information, and each component of the combined point cloud data corresponding to at least one parameter in the multi-frame combined point cloud information separately.

8. The method of claim 1, wherein writing the multi-frame combined point cloud information into the media streams of the combined point cloud data comprises one of the following:

writing the multi-frame combined point cloud information into track information in a media file;

writing the multi-frame combined point cloud information into supplemental enhancement information of the combined point cloud data; or writing the multi-frame combined point cloud information into video usability information of the combined point cloud data.

9. A data processing method, comprising:

parsing media streams of combined point cloud data to obtain multi-frame combined point cloud information; and processing, according to the multi-frame combined point cloud information, the combined point cloud data separately;

wherein the multi-frame combined point cloud information comprises one of the following parameters: a combined point cloud data transmission manner; and a combined point cloud data consumption manner;

wherein the combined point cloud data transmission manner comprises one of the following: preferentially transmitting geometric information after a combination, and then transmitting attribute information after the combination; simultaneously transmitting geometric information after a combination and attribute information after the combination; preferentially transmitting frame index information and geometric information after a combination, and then transmitting non-frame index attribute information after the combination; preferentially transmitting geometric information after a combination and non-frame index attribute information after the combination, and then transmitting frame index information; or transmitting geometric information after a combination, non-frame index attribute information after the combination, and frame index information in sequence; and wherein the combined point cloud data consumption manner comprises one of the following: preferentially consuming geometric information after a combination; preferentially consuming non-frame index attribute information after a combination; preferentially consuming geometric information after a combination and non-frame index attribute information after the combination; preferentially consuming frame index information and geometric information after a combination; or preferentially consuming frame index information.

10. The method of claim 9, wherein before parsing the media streams of the combined point cloud data to obtain the multi-frame combined point cloud information, the method further comprises:

receiving the media streams of the combined point cloud data sent by a sending end.

11. The method of claim 9, wherein before parsing the media streams of the combined point cloud data to obtain the multi-frame combined point cloud information, the method further comprises:

reading a locally pre-stored media file of the combined point cloud data.

12. A data processing apparatus, comprising:

a determination module configured to determine multi-frame combined point cloud information;

a writer configured to write the multi-frame combined point cloud information into media streams of combined point cloud data; and a sender configured to send, according to the multi-frame combined point cloud information, the media streams of the combined point cloud data to a receiving end separately;

wherein the multi-frame combined point cloud information comprises one of the following parameters: a combined point cloud data transmission manner; and a combined point cloud data consumption manner;

wherein the combined point cloud data transmission manner comprises one of the following: preferentially transmitting geometric information after a combination, and then transmitting attribute information after the combination; simultaneously transmitting geometric information after a combination and attribute information after the combination; preferentially transmitting frame index information and geometric information after a combination, and then transmitting non-frame index attribute information after the combination; preferentially transmitting geometric information after a combination and non-frame index attribute information after the combination, and then transmitting frame index information; or transmitting geometric information after a combination, non-frame index attribute information after the combination, and frame index information in sequence; and wherein the combined point cloud data consumption manner comprises one of the following: preferentially consuming geometric information after a combination; preferentially consuming non-frame index attribute information after a combination; preferentially consuming geometric information after a combination and non-frame index attribute information after the combination; preferentially consuming frame index information and geometric information after a combination; or preferentially consuming frame index information.

13. A communication node, comprising a communication module, a memory, and at least one processor;

wherein the communication module is configured to communicate between two communication nodes;

wherein the memory is configured to store at least one program; and wherein when executed by the at least one processor, the at least one program causes the at least one processor to implement the method of claim 1.

14. A non-transitory storage medium storing a computer program which, when executed by a processor, implements the method of claim 1.

15. A communication node, comprising a communication module, a memory, and at least one processor;

wherein the communication module is configured to communicate between two communication nodes;

wherein the memory is configured to store at least one program; and wherein when executed by the at least one processor, the at least one program causes the at least one processor to implement the method of claim 9.

16. A non-transitory storage medium storing a computer program which, when executed by a processor, implements the method of claim 9.

* * * * *